United States Patent
Phaal (10) Patent No.: US 9,722,926 B2
(45) Date of Patent: Aug. 1, 2017

(54) METHOD AND SYSTEM OF LARGE FLOW CONTROL IN COMMUNICATION NETWORKS

(71) Applicant: InMon Corp., San Francisco, CA (US)

(72) Inventor: Peter Phaal, San Francisco, CA (US)

(73) Assignee: InMon Corp., San Francisco, CA (US)

( * ) Notice: Subject to any disclaimer, the term of this patent is extended or adjusted under 35 U.S.C. 154(b) by 186 days.

(21) Appl. No.: 14/229,691

(22) Filed: Mar. 28, 2014

(65) Prior Publication Data

US 2015/0281085 A1    Oct. 1, 2015

(51) Int. Cl.
*H04L 12/801* (2013.01)

(52) U.S. Cl.
CPC ................................. *H04L 47/12* (2013.01)

(58) Field of Classification Search
None
See application file for complete search history.

(56) References Cited

U.S. PATENT DOCUMENTS

| | | |
|---|---|---|
| 4,922,488 A | 5/1990 | Niestegge |
| 5,256,958 A | 10/1993 | Eng et al. |
| 5,615,323 A | 3/1997 | Engel et al. |
| 5,790,799 A | 8/1998 | Mogul |
| 5,982,753 A | 11/1999 | Pendleton et al. |
| 6,085,243 A | 7/2000 | Fletcher et al. |
| 6,108,782 A | 8/2000 | Fletcher et al. |
| 6,308,148 B1 | 10/2001 | Bruins et al. |
| 6,356,532 B1 | 3/2002 | Richardson et al. |
| 6,425,015 B1 | 7/2002 | Jennings et al. |
| 6,473,400 B1 | 10/2002 | Manning |
| 6,529,475 B1 | 3/2003 | Wan et al. |
| 6,587,878 B1 | 7/2003 | Merriam |
| 6,724,729 B1 | 4/2004 | Sikdar |
| 6,785,286 B1 | 8/2004 | O'Keeffe et al. |
| 6,886,102 B1 | 4/2005 | Lyle |
| 6,894,972 B1 | 5/2005 | Phaal |
| 6,977,895 B1 * | 12/2005 | Shi ...................... H04L 12/5693 370/235 |
| 7,164,657 B2 | 1/2007 | Phaal |
| 2001/0055274 A1 | 12/2001 | Hegge et al. |

(Continued)

OTHER PUBLICATIONS

Brownlee "Traffic Flow Measurement: Meter MIB," Network Working Group RFC 2064, pp. 1-38 (Jan. 1997).

(Continued)

*Primary Examiner* — Chi H Pham
*Assistant Examiner* — Raul Rivas
(74) *Attorney, Agent, or Firm* — Kilpatrick Townsend & Stockton LLP (57) ABSTRACT

A method for controlling large flows in a network includes asynchronously calculating a traffic rate associated with a network flow by a controller device based on a randomly sampled packet, comparing the calculated traffic rate with a threshold value, and generating a notification of a large flow when the rate exceeds the threshold value. The method further includes creating a filter in response to the notification, assigning an action to the filter, and installing the filter and the action in a network device. In addition, the method includes removes the installed filter and action from the network device after a time interval has elapsed.

20 Claims, 4 Drawing Sheets

(56) References Cited

U.S. PATENT DOCUMENTS

| | | | |
|---|---|---|---|
| 2007/0076606 A1* | 4/2007 | Olesinski | H04L 41/0893 |
| | | | 370/230 |
| 2012/0297083 A1* | 11/2012 | Ferguson | H04L 45/00 |
| | | | 709/233 |
| 2014/0204786 A1 | 7/2014 | Phaal | |
| 2015/0089045 A1* | 3/2015 | Agarwal | H04L 43/024 |
| | | | 709/224 |

OTHER PUBLICATIONS

Claffy et al. "Application of Sampling Methodologies to Network Traffic Characterization," SIGCOMM '93 Conference proceedings on Communications architectures, protocols and applications, pp. 194-203 (Oct. 1993).

Phaal "Pragmatic software defined networking," available at http://blog.sflow.com/2013/03/pragmatic-software-defined-networking.html (Mar. 31, 2013).

* cited by examiner

METHOD AND SYSTEM OF LARGE FLOW CONTROL IN COMMUNICATION NETWORKS

CROSS-REFERENCES TO RELATED APPLICATIONS

The present application is related to U.S. patent application Ser. No. 14/162,489, filed on Jan. 23, 2014 and entitled "METHOD FOR ASYNCHRONOUS CALCULATION OF NETWORK TRAFFIC RATES BASED ON RANDOMLY SAMPLED PACKETS", the content of which is incorporated herein by reference in its entirety.

The present application is also related to U.S. Pat. No. 6,894,972, issued on May 17, 2005 and entitled "INTELLIGENT COLLABORATION ACROSS NETWORK SYSTEM", and U.S. Pat. No. 7,164,657, issued on Jan. 16, 2007 and entitled "INTELLIGENT COLLABORATION ACROSS NETWORK SYSTEMS", the contents of which are incorporated herein by reference in their entirety.

BACKGROUND OF THE INVENTION

The present invention relates to a network traffic control system and method for detecting large flows and applying control actions based on features of the detected large flows.

U.S. Pat. Nos. 6,894,972 and 7,164,657 discuss that prior art approaches of checking whether a packet belongs to a particular class of traffic can be expensive in terms of network resources and/or equipment costs. In addition, one prior art approach such as Cisco's Netflow™ monitoring system also suffers from delay problems.

A packet switching network such as the Internet includes multiple nodes connected together by multiple transmission links for transporting information in packet form from one or more source nodes to one or more destination nodes. A node can be a switch or a router.

Packet sampling is widely employed as a means of monitoring traffic in computer networks. The packet samples are used to estimate traffic levels (in packets per second or bits per second), based on properties identified in the packet headers, for example calculating the data rate associated with web traffic, to/from a particular network address, etc.

The current practice for analyzing sampled data is to accumulate totals over an interval, scale the result by the sampling rate, and then divide by the interval in order to report a rate (ref: Packet Sampling Basics <http://www.sflow.org/packetSamplingBasics/index.htm>).

The recent advent of Software Defined Networking (SDN) and related protocols such as OpenFlow have made it possible to rapidly reconfigure the network in response to changes in traffic detected. However, limitations in current approaches to measurement and control are slow to respond to changes and have limited scalability, making it difficult to address challenges such as Distributed Denial of Service (DDoS) mitigation, multi-path load balancing, and priority marking of traffic flows.

BRIEF SUMMARY OF THE INVENTION

Certain embodiments of the present invention relate to a system, device and method of controlling flows in a network having a number of network devices controlled by a controller device. The controller device is remote from the network devices and communicatively coupled to the network devices. In an embodiment, a method includes asynchronously calculating a traffic rate associated with a network flow by a controller device based on a randomly sampled packet, comparing the calculated traffic rate with a threshold value, and generating a notification of a large flow when the calculated traffic rate exceeds the threshold value. The method further includes creating a filter in response to the notification, assigning an action to the filter, and installing the filter and the action in a network device. In addition, the method includes removes the installed filter and action from the network device after a time interval has elapsed.

In another embodiment, a controller for controlling large flows within a communication network may include an interface unit coupled to the communication network. The interface unit is configured to receive a randomly sampled packet from a network device at a first time. The controller also includes a processing unit configured to calculate a rate value based on the received packet, and a comparator unit configured to compare the rate value with a threshold and generate a notification when the rate value exceeds the threshold. The controller also includes a control unit configured to create a filter and assign an action to the filter. The controller sends the filter and the action to the network device using an OpenFlow protocol. The network device is remote from the controller.

In yet another embodiment, a system for controlling large flows within a communication network may include a controller device, and a number of network devices communicatively coupled to the controller device. In an embodiment, at least one of the network devices samples a packet transiting in the communication network and generates a sample associated with the sampled packet. The controller device is configured to receive the sample, calculate a traffic rate associated based on the receive sample, compare the calculated traffic rate with a threshold, generate a notification of a large flow when the traffic rate exceeds the threshold. The controller device further creates a filter in response to the notification, assign an action to the filter, and install the filter and the action in the at least one of the network devices.

The following description, together with the accompanying drawings, will provide a better understanding of the nature and advantages of the claimed invention.

DETAILED DESCRIPTION OF THE INVENTION

This invention makes use of recent advances in network traffic monitoring. In particular, one embodiment of the invention makes use of the sFlow packet sampling technology (U.S. Pat. Nos. 6,894,972 and 7,164,657) that is widely incorporated in network equipment.

Figure 1:
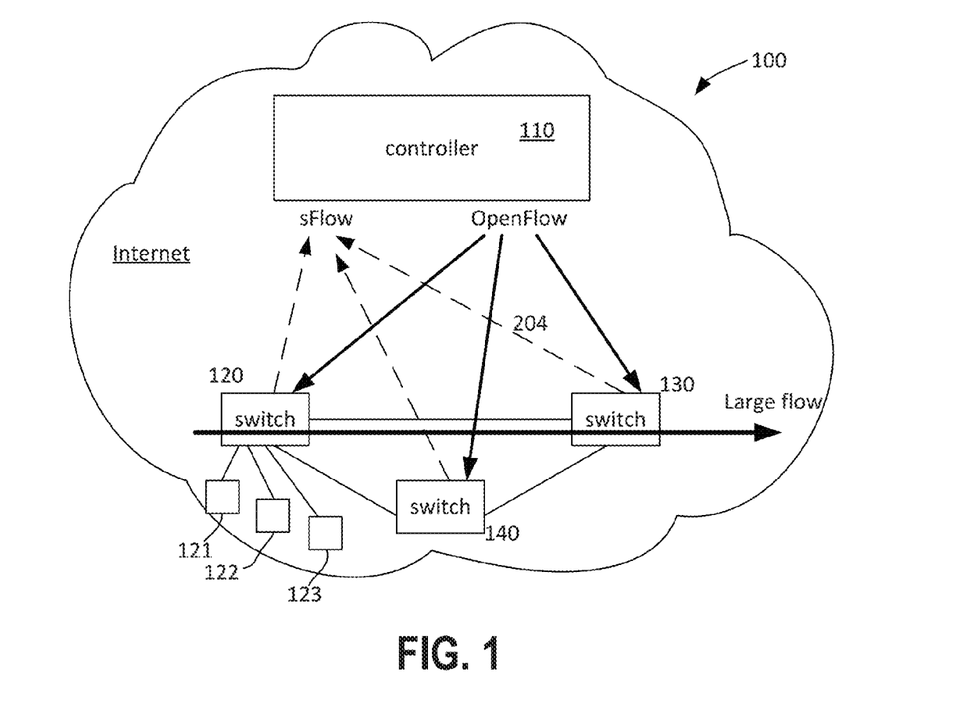
FIG. 1 is a simplified diagram of an example network system for controlling large flows according to an embodiment of the present invention.

In the present disclosure, a large flow is defined as a flow that consumes nearly 10 percent of a link bandwidth. FIG. 1 is a simplified diagram of an example network system 100 for controlling large flows according to an embodiment of the present invention. Network system 100 includes a controller 110 communicatively coupled to a number of network devices 120, 130 and 140. Each of network devices 120, 130, and 140 may be coupled to a number of hosts and configured to switch and/route data packets from one host to another host. For example, hosts 121, 122, and 123 are coupled to each other through network device 120. Each of network devices 120, 130, and 140 may be a multi-layer switch or router performing switching and/or routing of data packets between network segments of a data network. As described in U.S. Pat. Nos. 6,894,972 and 7,164,657, network devices 120, 130, and 140 each may have a monitor agent that randomly samples data packets transiting in the data network and generate reporting packets from the sampled data packets for controller 110. The reporting packets contain information about sampled data packets contained in the flows inside each of the network devices.

According to an embodiment, the reporting packets contain information relating to original packet lengths, the total number of samples taken, and the total number of packets from which samples were taken. The reporting packets are then sent over the network to controller 110 for analysis. In an embodiment, the reporting packets are sent to controller 110 using an sFlow protocol, as shown in FIG. 1. The sFlow protocol is an open standard for monitoring network devices by performing random sampling of packets and time-based sampling of counters. The sampled information (flow samples, counter samples) is then packaged as sFlow datagrams and sent to controller 110 for analysis. Although the sFlow protocol is used in a specific embodiment, it is understood that other open protocols such as Packet Sampling (PSAMP) protocol or OpenFlow protocol may also be used.

Controller device 110 is remote from network devices 120, 130, and 140 and sends OpenFlow rules to network devices 120, 130, and 140 using an OpenFlow protocol. In an embodiment, each of network devices 120, 130, and 140 may include a table made up of OpenFlow rules (entries), each of these rules consisting of a filter and a set of actions. The filter is used to match attributes of packets that enter the network device, and the set of actions is used to tell the network device what to do with a flow that matches the filter.

In a specific embodiment, system 100 may be an integrated hybrid OpenFlow system, in which packets for which there are no matching rules are handled in the normal fashion determined by existing routing or switching protocols such as the distributed routing protocol TRILL, spanning tree protocol, BGP, etc. When OpenFlow rules are present, they are given priority over the normal forwarding behavior and can be used to drop packets, rate limit packets, replicate packets, and alter path taken by packets (e.g., by specifying the egress port on the device, or by rewriting destination addressing information).

Figure 2:
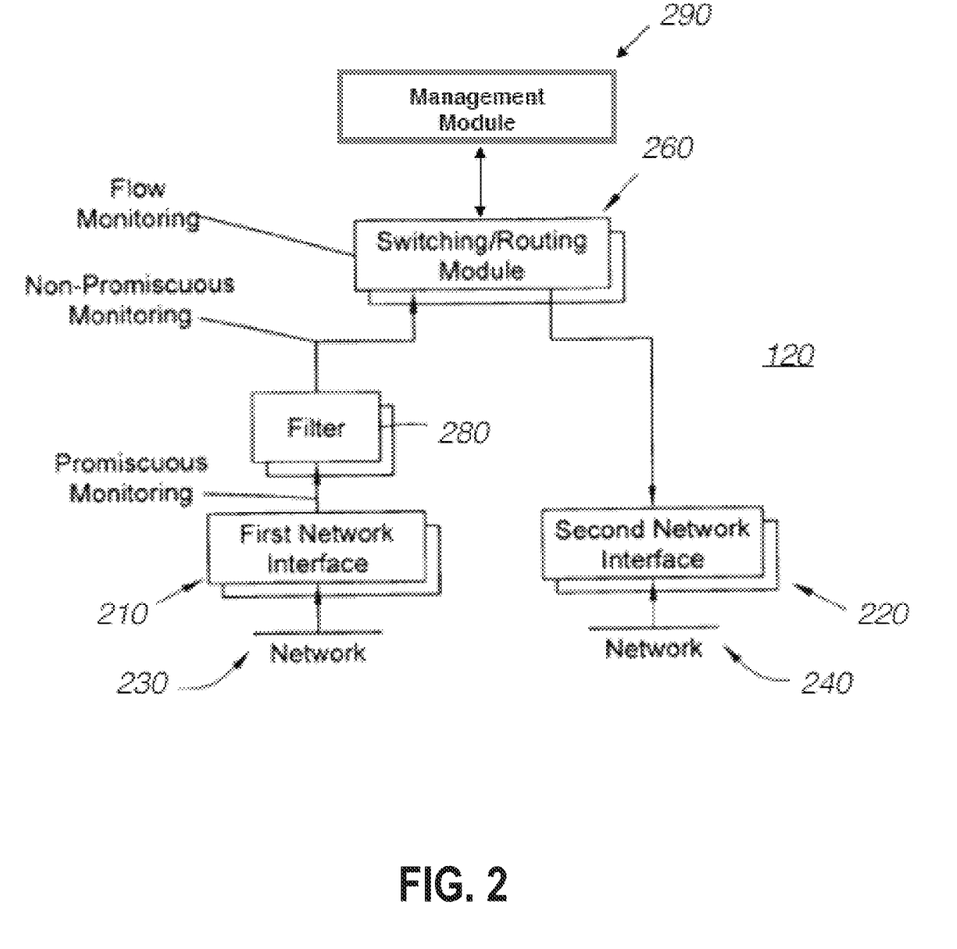
FIG. 2 is a simplified schematic block diagram of a switching device according to an embodiment of the present invention.

An example of a monitor agent has been described in detail in U.S. Pat. Nos. 6,894,972 and 7,164,657, entitled "Intelligent Collaboration Across Network System", the contents of which are incorporated herein by reference in their entirety. FIG. 2 shows logical entities within a typical network device (e.g., network device 120). For the present invention, network device 120 can either be a switch or a router. It is to be understood that the terms "network device", "routing device", "router", "switch", and "switching device" may alternatively be used hereinafter. As shown in the figure, switching device 120 comprises a first network interface 210 for receiving incoming message packets from one network segment 230; a packet filter 280 for screening message packets entering a switching/routing module 260; and a second network interface 220 for outputting the message packets to another network segment 240. The arrows show the path that a packet might take through the switch. Specifically, first network interface 210 is responsible for receiving all message packets flowing from first network segment 230 to switching device 120. Packet filter 280 filters out all message packets not addressed to enter the switching device 120 by verifying the destination address in the header of each message packet. Then, switching/routing module 260 directs the message packets to second network interface 220 connected to the designated network. Finally, second network interface 220 outputs the message packets to second network segment 240. In an embodiment, switching/routing module 260 may contain a packet sampler coupled to a management module 290. The packet sampler of switching/routing module 260 is configured to randomly sample packets that transit the module, and extracts information from the sampled packets. The extracted information may contain data relating to original packet lengths, packet types, the total number of samples taken, the number of packets from which samples were taken, source/destination addresses, next hop address, etc. The extracted information may be packaged in samples and sent to the management module 290. Management module 290 sends samples to controller device 110 using an open protocol such as the sFlow protocol. In an embodiment, the controller device (such as controller device 110) may calculate a rate of a particular source, destination, and/or a protocol that involve in a DOS attack in a network device and constructs dynamically a filter and an associated action to be installed in the affected network device by communicating with management module 290 using an open protocol such as OpenFlow, which in turn installs the filter in switching/routing module 260 to stop the attack.

According to the present invention, a flow is defined as all packets received on one interface and are sent to another interface (which in the case of a one-armed router, could be the same interface). For example, as shown in FIG. 1, a flow comprises message packets transmitted from the first network interface to the second network interface. In addition, a flow can also comprise message packets generated within the switching device locally for reporting the internal status of the switching device. According to the present invention, therefore, the sampling mechanism must ensure that any packet involved in a flow has an equal chance of being sampled.

In the preferred embodiment, each monitor agent is responsible for integrating the measurements from the distributed sampling points within the monitor agent. The monitor agent needs to generate global values for total_packets and total_samples whenever it creates a sample datagram. This can most easily be achieved by maintaining its own counters and accumulating the corresponding values from the sample messages it receives from the sampling engines. A less efficient method would be to poll each sampling engine for the counter values and sum them.

In addition, the monitor agent is also responsible for ensuring that, when sampling parameters are changed, these changes are propagated to all the sampling engines. The value of "Rate" will always need to be propagated to the sampling engines, and depending on the implementation of the sampling engine, other parameters may also be required.

According to the preferred embodiment of the present invention, the essential property of the random number generator is that the mean value of the numbers it generates converges to the required sampling rate (i.e. Rate). Other properties of the random number generator are not critical and the designer has considerable design freedom in constructing suitable random number generators. Thus, a uniform distribution random number generator is very effective and easy to implement in hardware or in software. The range of skip counts (i.e. the variance) does not significantly affect results because variation of plus or minus 10 percent of the mean value is sufficient.

Because a new skip value is only required every time a sample is taken, the monitor agent can generate the random numbers locally. In this case, each sampling engine maintains a queue of random numbers, so that when it needs to reset the skip count it can pull the next number from the queue. The monitor agent is responsible for adding new random numbers to the queue before it empties. The monitor agent will know that whenever it receives a sample from one of the sampling engines, it should generate, and enqueuer, a new random number.

An alternate design would include a hardware random number generator as part of each sampling engine. In this case, the registers controlling the behavior of the random number generator need to be accessible to the monitor server so that the sampling rate can be set.

Figure 3:
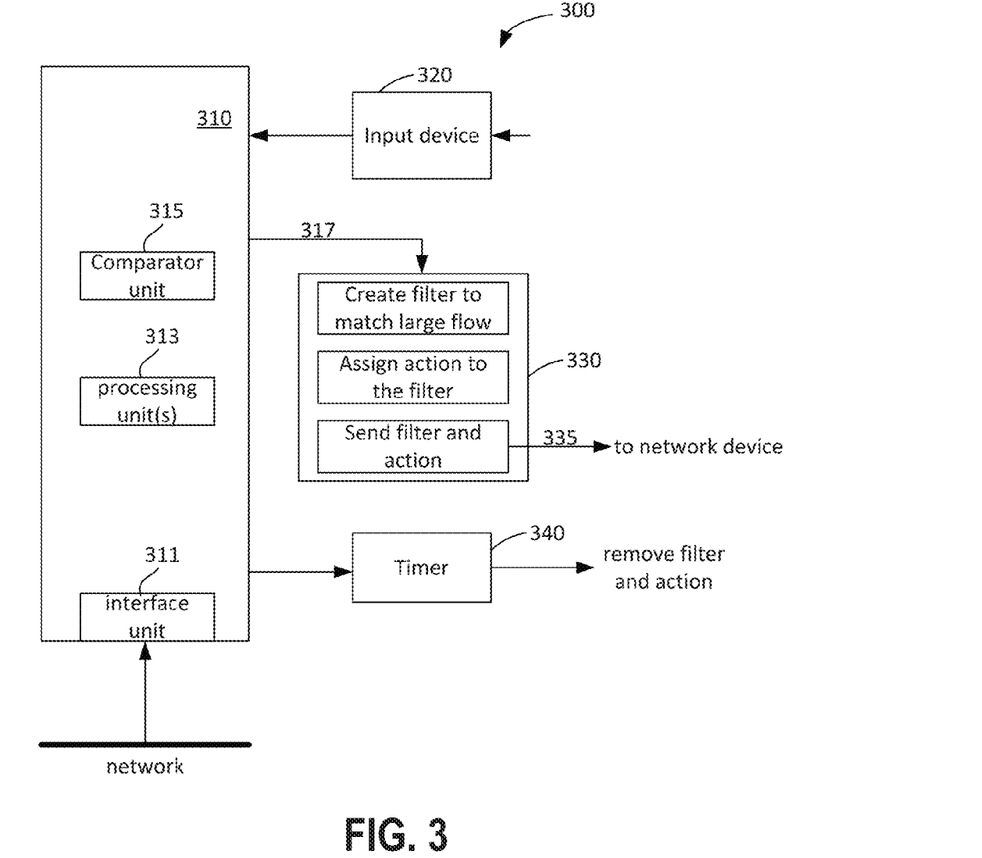
FIG. 3 is a simplified block diagram of a controller device according to an embodiment of the present invention.

An example of a real-time sFlow analyzer has been described in detail in U.S. application Ser. No. 14/162,489, filed Jan. 23, 2014, entitled "Method for Asynchronous Calculation of Network Traffic Rates Based on Randomly Sampled Packets", the content of which is incorporated herein by reference in its entirety. FIG. 3 is a simplified block diagram of a controller device 300 according to an embodiment of the present invention. Controller device 300 may include a real-time analytics block 310 that may have an interface unit 311 coupled to the network and configured to receive samples sent from one or more network devices (such as switching device 120 of FIG. 2). Real-time analytics block 310 may include a processor having one or more processing units 313 and coupled to a memory device (not shown). Real-time analytics block 310 performs remote analysis of traffic flow based on a received sample by computing a traffic rate associated with the received sample. The computation of a traffic rate has been described in detail in U.S. patent application Ser. No. 14/162,489, filed Jan. 23, 2014, entitled "Method for Asynchronous Calculation of Network Traffic Rates Based on Randomly Sampled Packets", the content of which is incorporated herein by reference in its entirety.

An example of a method for calculating a traffic rate by the controller device is briefly described herein. Controller device 300 receives a sample at a first sampling time, updates a state variable based on the received sample at a second sampling time, and calculates the traffic rate based on the updated state variable. The traffic rate is calculated while the state variable is being updated according to an exponential decay function, and the traffic rate may be calculated using a recursive single-pole low pass filter function.

Real-time analytics block 310 may be coupled to an input device 320 that allows a user (e.g., a network operator or system administrator) to define a flow key and value attributes such as any of the values in the header fields of a data packet, types of packets, packets/s, bytes/s, and the like. The user may also enter a flow threshold value to analytics block 310 through input device 320. Analytics block 310 may include a comparator unit 315 that compares the computed traffic rate with the user's defined flow threshold value. In the event that the computed traffic rate is found to exceed the threshold value, comparator unit 315 generates a large flow notification 317 to a control unit 330. Control unit 330 may create a filter based on the value attributes to match the large flow, assign an action or a set of actions to the filter, and send the filter and the action(s) 335 to the network device from which the controller device receives the sample. In an embodiment, control device 300 may install the filter and the action in the network device so that the network device can match flows according to the filter and performs an operation according to the action in the event that a flow matches the filter.

Controller device 300 further includes a clock unit 340 that enables the user to set a timeout interval. Within that timeout interval the filter and the action installed in the network device remain active to decide what to do with the flows matching the filter. After the timeout interval has elapsed, control device 300 may remove the filter and the action from the network device.

In accordance with embodiments of the present invention, real-time analytics block 310 may asynchronously calculate a traffic rate associated with a network flow based on a randomly sampled packet. The traffic rate may be calculated based on an updated state variable and an elapsed time since the state variable was previously updated. In a preferred embodiment, the state variable is updated using an infinite-impulse-response single-pole digital low pass filter, the detail of which is described in detail in U.S. patent application Ser. No. 14/162,489, filed Jan. 23, 2014, entitled "Method for Asynchronous Calculation of Network Traffic Rates Based on Randomly Sampled Packets.

Figure 4:
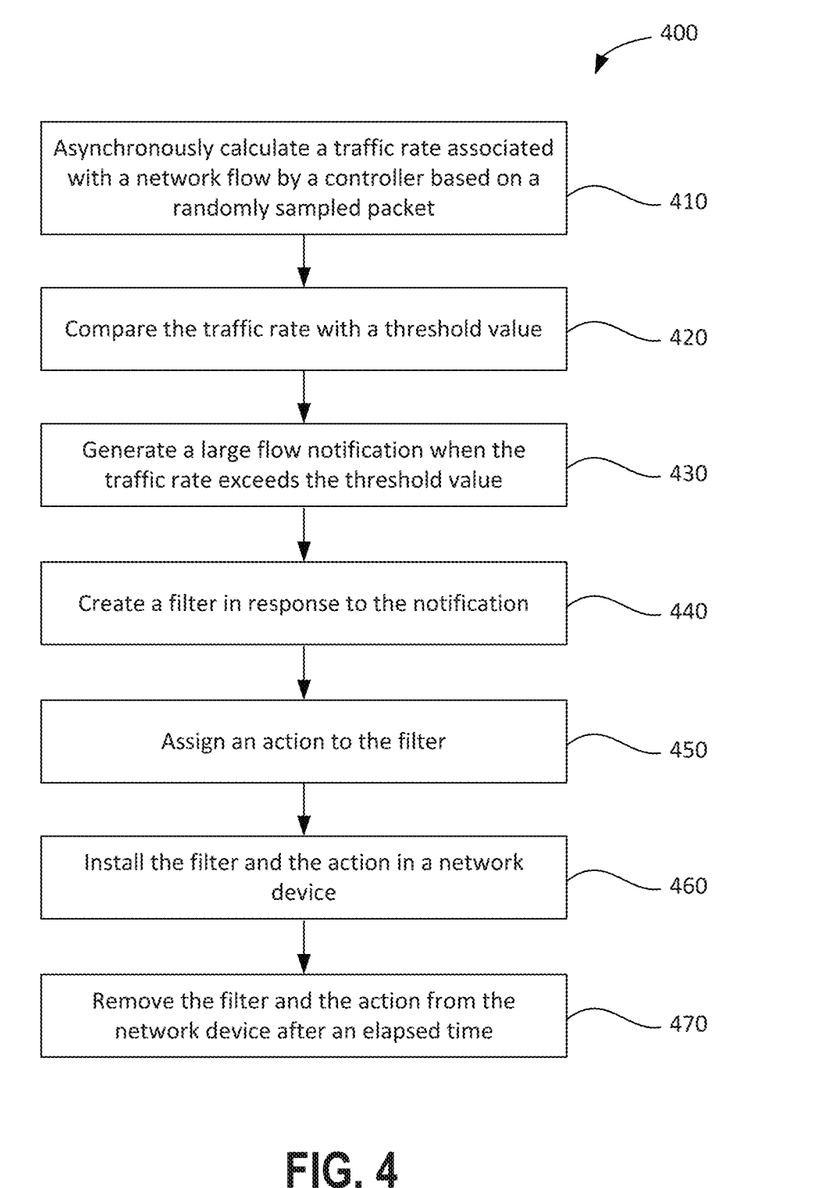
FIG. 4 is a flowchart diagram illustrating an example of a method for controlling large flows in a network according to an embodiment of the present invention.

FIG. 4 is a flowchart diagram illustrating an exemplary method 400 performed by a controller device such as controller device 300 for calculating a traffic rate based on randomly sampling of a packet transiting in a network by a network device. Method 400 also includes comparing the traffic rate with a threshold value, creating a filter and action and install the filter and action, in accordance with an embodiment of the present invention. Method 400 is described with references to the structures described in FIGS. 1-3. However, it should be understood that other structure could be used without departing from the scope of the present invention. At block 410, a controller device (e.g., controller device 300) receives a sample from a network device (e.g., device 120 in FIG. 2), and calculates a traffic rate in response to the sample. The sample may contain information of a randomly sampled data packet transiting in the network. When the sample is received at the controller device, a state variable is updated, and the traffic rate is calculated based on the updated state variable. The state variable can be a value associated with the packet. At block 420, the controller device compares the calculated traffic rate value with a threshold value, which may be defined by a user. In another embodiment, the threshold value may be automatically set by the controller device based on a percentage of the bandwidth of a link. For example, if the bandwidth of a link segment between two network devices is N packets or bytes per seconds, than the threshold value will be set to one tenth of the bandwidth. At block 430, a notification of a large flow is generated when the traffic rate is determined to exceed the threshold value. At block 440, the controller device creates a filter in response to the large flow notification and assigns an action to the filter at block 450. At block 450, the controller device installs the filter and the action in a network device (e.g., switch 120, 130, or 140 in FIG. 1). The installed filter and the action may be stored as an entry in a flow table. In an embodiment, the controller device sends the created filter and action to the network device using an OpenFlow protocol. The table of the network device may be made up of a number of OpenFlow entries, each of the entries consists of a filter configured to match flows and an action configured to drop, rate limit, replicate packets, and/or alter paths taken by the packets when the flows match the filter. At block 470, the controller device may remove the filter and the action of the network device after a timeout interval has been elapsed.

The process blocks described above can be implemented in software, hardware, and/or firmware. The structures shown in the Figures can be implemented using code and data stored and executed on one or more electronic devices using non-transitory tangible machine-readable media (e.g., magnetic disks, optical disks, ROM, RAM, Flash memory devices and other memory devices). Such electronic devices typically include one or more processing units and one or more network interface units. The one or more processing units are coupled to one or more memory devices that may be embedded in the electronic devices.

One important application for this controller is to mitigate Distributed Denial of Service (DDoS) attacks. In a DDoS attack, large numbers of compromised hosts on the Internet are directed to send traffic to a designated target with the goal of overwhelming the capacity of the links connecting the target to the Internet. In this case a large flow may be characterized by the destination address and layer 3/4 protocol (for example popular protocols for denial of service attacks include DNS, NTP, ICMP). When a large flow is detected by the controller it creates a filter matching the specific destination address and protocol attributes of the detected large flow and uses OpenFlow to send a rule to a switch reporting the traffic in order to match and drop the traffic associated with the DDoS attack, thus preventing the traffic from reaching the intended victim's network links. An alternative action would be to apply an action to lower the priority of the large flow and prevent it from affecting other classes of traffic. A further alternative would be to modify the destination of the traffic (by using an action to modify the egress port on the switch, or by changing the destination MAC address) in order to send the traffic to a filtering device which will remove the DDoS traffic and allow non-attack traffic to proceed to its destination.

Depending on the application of the controller, different flow keys and values are configured in the real-time analytics software (described in patent application Ser. No. 14/162,489, filed Jan. 23, 2014, entitled "Method for Asynchronous Calculation of Network Traffic Rates Based on Randomly Sampled Packets"). For example, in the DDoS mitigation example described, the flow keys might be destination IP address and UDP source port, and the value might requested in bytes per second. A threshold is also provided that is used to separate large from small flows. Again, referring to the DDoS mitigation example, the threshold might be 125,000,000 bytes per second (representing 10% of the bandwidth on a 10 Gbit/s link). When a large flow is detected (that is the rate value associated with the flow exceeds the specified threshold) then a notification is sent to the controller. The controller extracts attributes from the flow notification and creates an OpenFlow match rule specific to the large flow. In the DDoS mitigation example, creating a rule to match the specific destination IP address and UDP source port associated with the large flow notification. Based on the configured policy, an action is assigned to the rule (for example to drop the packets), and the filter and action are sent to the switch associated with the large flow. Once the rule is received by the switch, the traffic is dropped and no longer reaches the intended victim. The controller later removes the rule, either based on a timeout, or because the traffic is no longer being observed by analytics software. If the attack still persists, then a new large flow notification will be generated and the rule will re-instated.

While DDoS mitigation is described as an application for the large flow controller device there are many other applications that would be apparent to practitioners skilled in the art. Large flows result from data replication, backup, streaming media etc. and are common on most networks. The present invention can be applied to control large flows in order to make most efficient use of network resources (for example by finding alternative paths for flows that are competing for the same link). In an example of the numerous applications, the controller device may automatically detect each large flow present in the network and dynamically configure the associated network device to mark packet as they enter the network device to direct the packets to different ports to balance the network load.

While integrated hybrid OpenFlow is described in the preferred embodiment, other hybrid control protocols exist and may be developed that anyone skilled in the art could use to install filters and actions in network devices, examples include: I2RS, BGP FlowSpec, NETCONF, HTTP control API's, etc.

As would be apparent to those skilled in the art, the various functions of rate value calculations may be implemented with circuit elements or may also be implemented in the digital domain as processing steps in a software program. Such software program can be implemented in a digital signal processing unit, a general-purpose-processor, a network processor. The various functions may also be implemented with various modules of a processor. The present invention can also be implemented in the form of program code stored in a machine-readable storage medium such as hard drives, flash memory, ROMS, and the like.

The present invention is not limited to the above-described implementations. The invention is intended to cover all modifications and equivalents within the scope of the appended claims.

What is claimed is:

1. A method for controlling large flows in a network system comprising a controller device communicatively coupled to a plurality of network devices, the method comprising:

generating a random number by a random number generator of a network device;

sampling a packet by the network device in response to the generated random number;

asynchronously calculating a traffic rate associated with a network flow by the controller device based on the randomly sampled packet;

comparing the calculated traffic rate with a threshold value;

generating a notification of a large flow when the rate exceeds the threshold value;

creating a filter in response to the notification;

assigning an action to the filter; and installing the filter and the action in the network device, wherein asynchronously calculating the traffic rate comprises:

receiving the randomly sampled packet by the controller device at a first time;

updating a state variable based on the received sampled packet at a second time; and calculating the traffic rate at the second time based on the updated state variable.

2. The method of claim 1, wherein
calculating the traffic rate at the second time is performed while the state variable is being updated according to an exponential decay function.

3. The method of claim 1, wherein the controller device is geographically remote from the network device and communicatively coupled to the network device via an Internet Protocol network.

4. The method of claim 3, wherein the network device sends the randomly sampled packet to the controller device using an sFlow protocol or a PSAMP protocol.

5. The method of claim 1, wherein asynchronously calculating the traffic rate comprises:
performing a single-pole recursive low-pass filter operation.

6. The method of claim 1, wherein installing the filter and the action in the network device comprises program a behavior of the network device through an OpenFlow protocol.

7. The method of claim 6, wherein the network device controls the network flow by performing an operation of dropping packets, rate limiting packet, setting priority of packets, changing egress port, changing a destination address, or a combination thereof.

8. The method of claim 1, wherein the threshold value is a percentage of a bandwidth of the network device.

9. The method of claim 1, wherein the randomly sampled packet comprises a value associated with a parameter of a data packet.

10. The method of claim 9, wherein the parameter comprises a size or a type of the data packet.

11. The method of claim 1, further comprising:
removing the filter and the action from the network device after a time interval.

12. An apparatus for controlling large flows within a communication network, the apparatus comprising:
an interface unit coupled to the communication network and operative to receive a randomly sampled packet from a network device using a random number generator at a first time;
a processing unit operative to asynchronously update a state variable based on the received packet at a second time, and calculate a rate value based on the updated state variable; and
a comparator unit operative to compare the rate value with a threshold and generate a notification when the rate value exceeds the threshold; and
a control unit operative to create a filter and assign an action to the filter;
wherein the apparatus sends the filter and the action to the network device using an OpenFlow protocol,
wherein the network device is geographically remote from the apparatus.

13. The apparatus of claim 12, wherein the processing unit asynchronously updates the state variable using a single-pole recursive low pass filter function.

14. The apparatus of claim 12, wherein the second time is selected at a random time interval from the first time.

15. The apparatus of claim 13, wherein the apparatus removes the filter and the action from the network device after a time interval.

16. A system for controlling large flows within a communication network, the system comprising:
a controller device; and
a plurality of network devices communicatively coupled to the controller device,
wherein at least one of the network devices randomly samples a packet transiting in the communication network using a random number generator and generates a sample associated with the randomly sampled packet, and
wherein the controller device is configured to:
receive the sample at a first time;
asynchronously update a state variable based on the received sample at a second time;
calculate a traffic rate based on the updated state variable;
compare the calculated traffic rate with a threshold;
generate a notification of a large flow when the traffic rate exceeds the threshold;
create a filter in response to the notification;
assign an action to the filter; and
install the filter and the action in the at least one of the network devices.

17. The system of claim 16, wherein the at least one of the network devices sends the sample to the controller device using an sFlow protocol or a PSAMP protocol.

18. The system of claim 16, wherein the controller device is further configured to remove the installed filter and the action from the at least one of the network devices after a time interval.

19. The system of claim 16, wherein the network devices are interconnected to each other and the threshold is a percentage of a bandwidth of a link between two network devices.

20. The system of claim 16, wherein the filter and the action are installed using an OpenFlow protocol.

* * * * *